United States Patent
Hwang et al.

(10) Patent No.: US 7,830,764 B2
(45) Date of Patent: Nov. 9, 2010

(54) INFORMATION RECORDING MEDIUM, RECORDING/REPRODUCING APPARATUS, AND RECORDING/REPRODUCING METHOD TO DISTINGUISH BETWEEN AN ORIGINAL RECORDING BLOCK AND A REPLACEMENT RECORDING BLOCK

(75) Inventors: Sung-hee Hwang, Seoul (KR); Jung-wan Ko, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 12/019,714

(22) Filed: Jan. 25, 2008

(65) Prior Publication Data

US 2008/0112282 A1    May 15, 2008

Related U.S. Application Data

(63) Continuation of application No. 11/152,237, filed on Jun. 15, 2005.

(30) Foreign Application Priority Data

Jul. 30, 2004    (KR) .............................. 2004-60282

(51) Int. Cl.
*G11B 7/00* (2006.01)
(52) U.S. Cl. ................................ 369/53.17; 369/53.16
(58) Field of Classification Search .............. 369/53.17, 369/53.16, 124.07, 124.08
See application file for complete search history.

(56) References Cited

U.S. PATENT DOCUMENTS

| | | | |
|---|---|---|---|
| 6,138,203 A | 10/2000 | Inokuchi et al. | |
| 6,189,118 B1 * | 2/2001 | Sasaki et al. | 714/710 |
| 6,389,569 B1 * | 5/2002 | Chung et al. | 714/763 |
| 7,088,648 B2 * | 8/2006 | Park et al. | 369/47.14 |
| 7,096,237 B2 * | 8/2006 | Kimura et al. | 707/205 |
| 7,423,946 B2 | 9/2008 | Ko et al. | |
| 2001/0043525 A1 | 11/2001 | Ito et al. | |
| 2004/0064754 A1 * | 4/2004 | Lee | 714/8 |
| 2004/0076049 A1 | 4/2004 | Park et al. | |

(Continued)

FOREIGN PATENT DOCUMENTS

CN    2519984 Y    11/2006

(Continued)

OTHER PUBLICATIONS

U.S. Appl. No. 11/152,237, filed Jun. 15, 2005, Sung-hee Hwang et al., Samsung Electronics Co., Ltd.

(Continued)

*Primary Examiner*—Wayne R Young
*Assistant Examiner*—Latanya Bibbins
(74) *Attorney, Agent, or Firm*—NSIP Law (57) ABSTRACT

An information recording medium, and a recording/reproducing apparatus and a recording/reproducing method for the recording medium. Original data is sequentially updated by replacing an original recording block with one or more replacement recording blocks. A replacement recording block includes at least one of an original address field indicating a location of the original recording block or a previous address field indicating a location of an immediately previous recording block. Replacement information is effectively recovered in a system where a replacement for logical overwriting (LOW) occurs in either a spare area and a user data area by reference to the address fields in each replacement recording block.

10 Claims, 10 Drawing Sheets

U.S. PATENT DOCUMENTS

| | | | |
|---|---|---|---|
| 2004/0114474 | A1 | 6/2004 | Park et al. |
| 2004/0174793 | A1* | 9/2004 | Park et al. ............... 369/59.25 |
| 2004/0246852 | A1 | 12/2004 | Hwang et al. |
| 2005/0188152 | A1* | 8/2005 | Park ........................... 711/112 |
| 2008/0304391 | A1 | 12/2008 | Gushima et al. |

FOREIGN PATENT DOCUMENTS

| | | |
|---|---|---|
| EP | 1 152 414 A2 | 11/2001 |
| JP | 2214924 | 8/1990 |
| RU | 99109570 A | 1/2001 |
| TW | 466479 | 12/2001 |
| TW | 586110 | 5/2004 |
| WO | WO 2004/029939 | 4/2004 |
| WO | WO 2004/053874 A1 | 6/2004 |

OTHER PUBLICATIONS

U.S. Appl. No. 12/019,720, filed Jan. 25, 2008, Sung-hee Hwang et al., Samsung Electronics Co., Ltd.

U.S. Appl. No. 12/019,725, filed Jan. 25, 2008, Sung-hee Hwang et al., Samsung Electronics Co., Ltd.

Office Action issued by Taiwanese Patent Office in Taiwanese Patent Application No. 94120395 on Dec. 26, 2008.

Office Action issued in Chinese Patent Application No. 200710126917.6 on May 8, 2009.

Decision on Grant of Patent dated May 28, 2009 for Russian Patent Application No. 2008102830.

Canadian Office Action issued on Jul. 9, 2010, in corresponding Canadian Application No. 2,575,418 (3 pages).

International Search Report and Written Opinion of the International Searching Authority issued on Sep. 30, 2005, in counterpart International Application No. PCT/KR2005/002293 (6 pages).

* cited by examiner

REPLACEMENT ENTRY

| ENTRY # | ORIGINAL ADDRESS | REPLACEMENT ADDRESS |
|---|---|---|
| 1 | PSN a | PSN a−1 |
| 1 | PSN a | PSN a+1 |
| 2 | PSN a+1 | PSN a+2 |
| 2 | PSN a+1 | PSN a+3 |

CHANGE (between rows 1 and 2)
CHANGE (between rows 3 and 4)

FIG. 9A

| 1 | PSN a | PSN a−1 |
|---|---|---|

FIG. 9B

| 1 | PSN a | PSN a+1 |
|---|---|---|

FIG. 9C

| 2 | PSN a+1 | PSN a+2 |
|---|---|---|

FIG. 9D

| 2 | PSN a+1 | PSN a+3 |
|---|---|---|

INFORMATION RECORDING MEDIUM, RECORDING/REPRODUCING APPARATUS, AND RECORDING/REPRODUCING METHOD TO DISTINGUISH BETWEEN AN ORIGINAL RECORDING BLOCK AND A REPLACEMENT RECORDING BLOCK

CROSS-REFERENCE TO RELATED PATENT APPLICATIONS

This application is a continuation of application Ser. No. 11/152,237 filed on Jun. 15, 2005, currently pending, which claims the benefit of Korean Patent Application No. 2004-60282 filed on Jul. 30, 2004, in the Korean Intellectual Property Office, the disclosures of which are incorporated herein by reference.

BACKGROUND OF THE INVENTION

1. Field of the Invention

Aspects of the present invention relate to information recording media, and more particularly, to an information recording medium, a recording/reproducing apparatus, and a recording/reproducing method, by which data replacement upon logical overwrite (LOW) occurring in a spare area or in a user data area may be efficiently managed.

2. Description of the Related Art

Rewritable information recording media generally include a spare area in a portion of a data area to achieve defect management. In other words, when defective data is detected while user data is being recorded in a user data area (an area left by excluding the spare area from the data area) or while data recorded in the user data area is being reproduced, a replacement of the defective data is recorded in the spare area.

In write-once information recording media, such defect management method is applied to logical overwrite (LOW). Logical overwrite is a technique that generates the same effect as the rewrite of data to write-once information recording media. In other words, to update data already recorded in the user data area, the recorded data is treated as defective data, and replacement data that replaces the recorded data is recorded in the spare area. Accordingly, the logical address of the data already recorded in the user data area is still used as the logical address of the replacement data, although the physical address of the replacement data is different from the physical address of the already-recorded data. Hence, a host can detect that the data already recorded in the user data area was overwritten, because the host accesses only a logical address. Thus, the host can easily manage the write-once information recording media.

However, a method of recording update data in an unrecorded area of a user data area instead of a spare area and providing replacement information (i.e., defect entry information) has been used to achieve LOW based on defect management to fully utilize the capacity of a write-once information recording medium.

This recording of a replacement in the unrecorded area of the user data area to achieve LOW complicates the recovery of replacement data destroyed by power failure or an error of replacement information. Where an area in which a replacement of defective data or a replacement for LOW is recorded is limited to a spare area, a replacement block exists only in the spare area. Hence, replacement data can be recovered by searching only the separate spare area for replacement blocks. However, as a user data area is used as the area in which a replacement of defective data or a replacement for LOW is recorded, there appears a need to classify the blocks recorded in a user area on an information recording medium into user blocks (original data block that is not replaced by a new block) and replacement blocks. In addition, where replacement data is recorded in the user data area, predetermined rules are needed to easily recover the replacement data.

In summary, where a replacement of user data for LOW cannot be recorded only in a spare area but also in a user data area, user blocks cannot be distinguished from replacement blocks due to the absence of a physical boundary between a physical area in which the user blocks are recorded and a physical area in which the replacement blocks are recorded. Particularly, where a user block is replaced by a replacement block, and the replacement block is replaced again, a final replacement block cannot be identified. Finally, a drive system cannot distinguish between a case where a replacement block is replaced again and a case where a block is recorded in a physically unrecorded space in response to a command to record data in a space that is physically recorded with data but logically unrecorded.

Figure 1A:
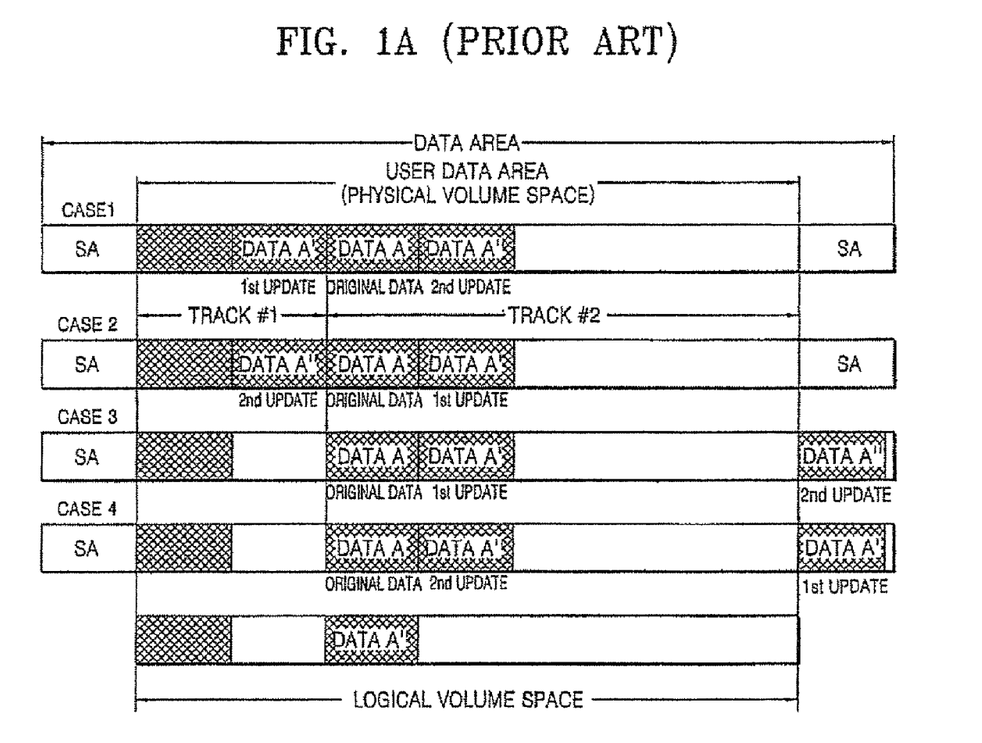
FIGS. 1A through 1C are reference diagrams illustrating conventional problems.

The above mentioned conventional problems will now be described with reference to FIGS. 1A through 1C. Referring to FIG. 1A, in case 1, a 1st update of original data A is recorded in track #1, and a 2nd update is recorded in track #2. In case 2, a 1st update of original data A is recorded in track #2, and a 2nd update is recorded in track #1. In case 3, a 1st update of original data A is recorded in track #2, and a 2nd update is recorded in a spare area SA. In case 4, a 1st update of original data A is recorded in a spare area, and a 2nd update is recorded in track #2.

As shown in FIG. 1A, although only data A″ obtained by updating original data A twice exists in a logical space, a final update, namely, data A″, is recorded in different locations in a physical space in cases 1 through 4.

Figure 1B:
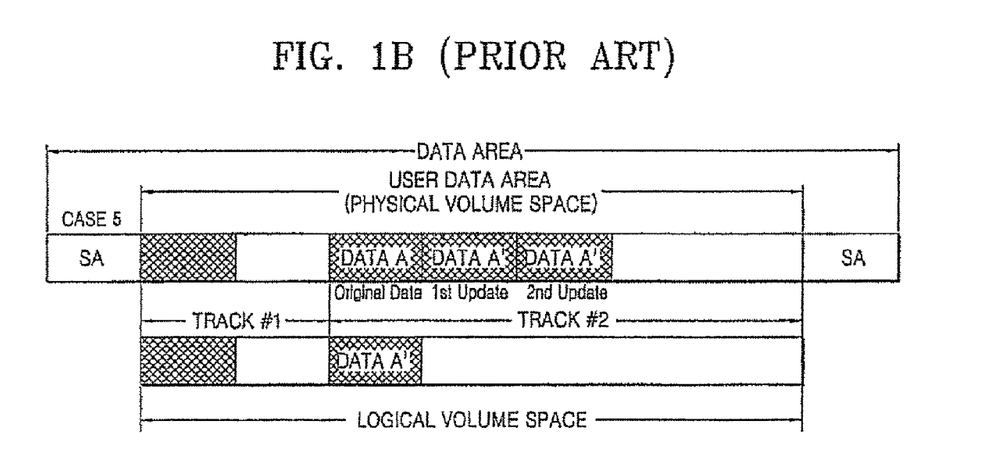
Figure 1C:
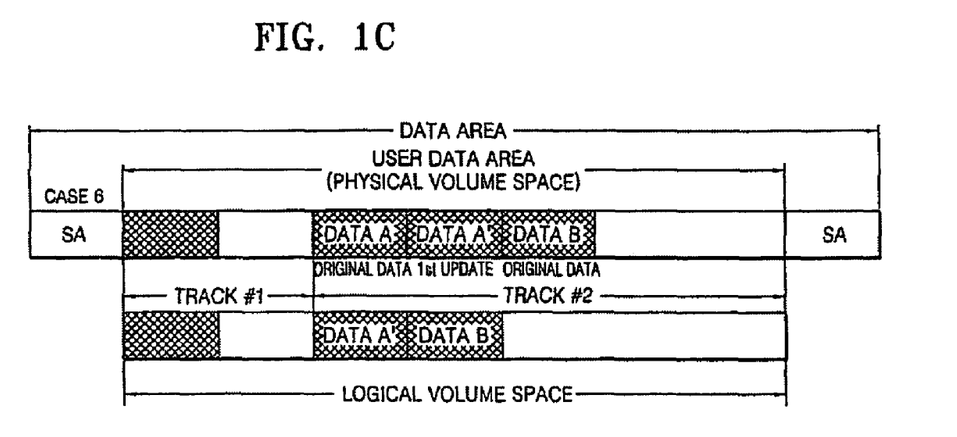

Referring to FIG. 1B, in case 5, original data, data A, a first update of the data A, data A′, and a second update of the data A, data A″, are sequentially recorded in a physical volume space of track #2 in a user data area. Referring to FIG. 1C, in case 6, original data, data A, a first update of the data A, data A′, and original data, data B, are sequentially recorded in a physical volume space of track #2 in a user data area.

As shown in cases 5 and 6, although physical recording statuses in cases 5 and 6 are the same, recording statuses of actual information recording mediums in cases 5 and 6 are different. Thus, a block to be recorded needs to include specific information so that a drive system can distinguish two different cases.

SUMMARY OF THE INVENTION

An aspect of the present invention provides an information recording medium, a recording/reproducing apparatus, and a recording/reproducing method, by which a replacement for logical overwriting (LOW) occurs in any of a spare area and a user data area to thereby improve the efficiency of data reproduction.

According to an aspect of the present invention, there is provided an information recording medium comprising: a user data area for recording user data; and a spare area for replacing a defect in the user data area, wherein: a replacement recording block that replaces an original recording block recorded in the user data area is recorded in the spare area or an unrecorded area of the user data area, and a recording block includes at least one of an original address or a previous address, the original address indicating a location of the original recording block and the previous address indicating a location of an immediately previous recording block.

The recording block may include a data part that contains original data or replacement data and an additional information part that contains additional information about the original data or the replacement data. The additional information part may contain at least one of the original address or the previous address.

According to another aspect of the present invention, there is provided an information recording medium comprising: a user data area for recording user data; and a spare area for replacing a defect in the user data area, wherein: a replacement recording block that replaces an original recording block recorded in the user data area is recorded in the spare area or an unrecorded area of the user data area; and each of the original recording block and the replacement recording block includes identification information useable to determine whether each recording block is the original recording block or the replacement recording block.

Each recording block may include a data part that contains original data or replacement data and an additional information part that contains additional information about the original data or the replacement data. The additional information part may contain the identification information.

The additional information part may comprise at least one of an original address field that indicates a location of the original recording block or a previous address field that indicates a location of an immediately previous recording block. The identification information may be a specific identifier recorded in at least one of the original address field or the previous address field.

According to another aspect of the present invention, there is provided an information recording medium comprising: a user data area for recording user data; and a spare area for replacing a defect detected in the user data area, wherein: a replacement recording block that replaces an original recording block recorded in the user data area is recorded in the spare area or an unrecorded area of the user data area; and a value of a physical address of the replacement recording block is always larger than a value of a physical address of a recording block previous to the replacement recording block and a value of a physical address of the original recording block or always smaller than a value of a physical address of a recording block previous to the replacement recording block and a value of a physical address of the original recording block.

According to another aspect of the present invention, there is provided a recording/reproducing apparatus comprising: a write/read unit writing data to and reading data from an information recording medium having a user data area for recording user data and a spare area for replacing a defect in the user data area, wherein a replacement recording block that replaces an original recording block recorded in the user data area is recorded in the spare area or an unrecorded area of the user data area; and a controller controlling the write/read unit to write a recording block on the information recording medium, wherein the written recording block includes at least one of original address information indicating a location of the original recording block or previous address information indicating a location of an immediately previous recording block for the original recording block.

According to another aspect of the present invention, there is provided a recording/reproducing apparatus comprising: a write/read unit writing data to and reading data from an information recording medium having a user data area for recording user data and a spare area for replacing a defect in the user data area, wherein a replacement recording block that replaces an original recording block recorded in the user data area is recorded in the spare area or an unrecorded area of the user data area; and a controller controlling the write/read unit to write a recording block on the information recording medium, wherein the written recording block includes identification information used to determine whether the written recording block is an original recording block or a replacement recording block.

According to another aspect of the present invention, there is provided a recording/reproducing apparatus comprising: a write/read unit writing data to and reading data from an information recording medium having a user data area for recording user data and a spare area for replacing a defect in the user data area, wherein a replacement recording block that replaces an original recording block recorded in the user data area is recorded in the spare area or an unrecorded area of the user data area; and a controller controlling the write/read unit to write the replacement recording block on the information recording medium so that a value of a physical address of the replacement recording block is always larger than a value of a physical address of a previous replacement recording block and a value of a physical address of the original recording block or always smaller than a value of the physical address of the previous replacement recording block and a value of the physical address of the original recording block.

According to another aspect of the present invention, there is provided a recording/reproducing apparatus comprising: a write/read unit writing data to and reading data from an information recording medium having a user data area for recording user data and a spare area for replacing a defect in the user data area, wherein a replacement recording block that replaces an original recording block recorded in the user data area is recorded in the spare area or an unrecorded area of the user data area; and a controller recovering replacement information about the original recording block and the replacement recording block by referring to an original address field of the replacement recording block that indicates a location of the original recording block and a previous address field of the replacement recording block that indicates a location of an immediately previous recording block, which is replaced by the replacement recording block.

According to another aspect of the present invention, there is provided a recording/reproducing method comprising: writing data to and reading data from an information recording medium having a user data area for recording user data and a spare area for replacing a defect in the user data area, wherein a replacement recording block that replaces an original recording block recorded in the user data area is recorded in the spare area or an unrecorded area of the user data area; and writing a recording block on the information recording medium, wherein the recording block comprises at least one of an original address field indicating a location of the original recording block or a previous address field indicating a location of an immediately previous recording block.

According to another aspect of the present invention, there is provided a recording/reproducing method comprising: writing data to and reading data from an information recording medium having a user data area for recording user data and a spare area for replacing a defect in the user data area, wherein a replacement recording block that replaces an original recording block recorded in the user data area is recorded in the spare area or an unrecorded area of the user data area; and writing a recording block on the information recording medium, wherein the recording block comprises identification information used to determine whether the written recording block is an original recording block or a replacement recording block.

According to another aspect of the present invention, there is provided a recording/reproducing method comprising:

writing data to and reading data from an information recording medium having a user data area for recording user data and a spare area for replacing a defect in the user data area, wherein a replacement recording block that replaces an original recording block recorded in the user data area is recorded in the spare area or an unrecorded area of the user data area; and writing a replacement recording block on the information recording medium so that a value of a physical address of the replacement recording block is always larger than a value of a physical address of a recording block previous to the replacement recording block and a value a physical address of the original recording block or always smaller than a value of a physical address of the recording block previous to the replacement recording block and the value the physical address of the original recording block.

According to another aspect of the present invention, there is provided a recording/reproducing method comprising: writing data to and reading data from an information recording medium having a user data area for recording user data and a spare area for replacing a defect in the user data area, wherein a replacement recording block that replaces an original recording block recorded in the user data area is recorded in the spare area or an unrecorded area of the user data area; and recovering replacement information about the original recording block and the replacement recording block by referring to an original address field of the replacement recording block that indicates a location of the original recording block and a previous address field of the recording block that indicates a location of an immediately previous recording block, which is replaced by the replacement recording block.

Where the immediately previous recording block is also the original recording block, the original address field and the previous address field may have a same value.

Where an expression of the form "at least one of A or B" is used herein, the expression should be interpreted as A or B or A and B.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2:
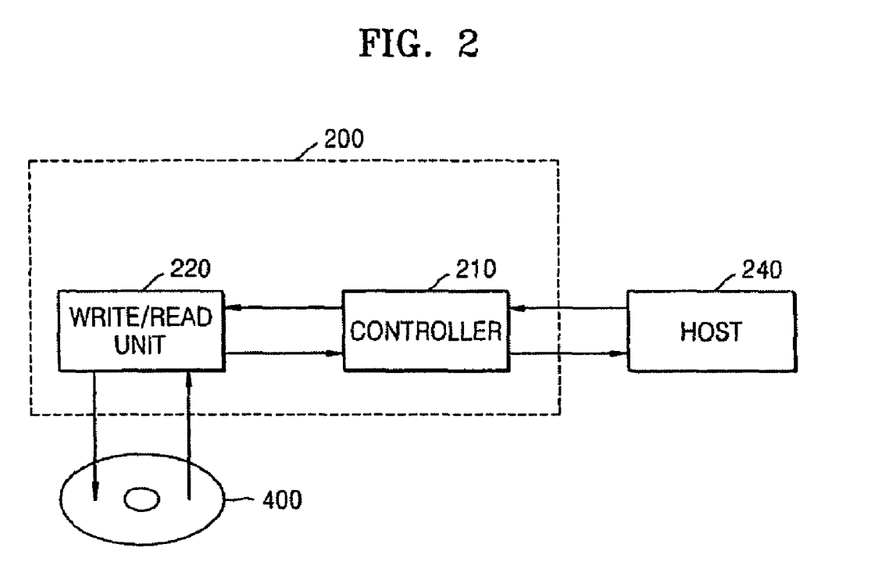
FIG. 2 is a block diagram of a recording/reproducing apparatus according to an embodiment of the present invention.

FIG. 2 is a block diagram of a recording/reproducing apparatus 200 according to an embodiment of the present invention. Referring to FIG. 2, the recording/reproducing apparatus 200 includes a write/read unit 220 and a controller 210. The write/read unit 220 writes data to an information recording medium 400, under control of the controller 210 and reads out written data to reproduce the written data. The controller 210 controls the write/read unit 220 to write/read data in a recording unit block or obtains effective data by processing data read by the write/read unit 220. The recording/reproducing apparatus 200 as disclosed herein includes features for recording and reproducing; however, as will be appreciated by persons skilled in the art, some aspects of the invention relate only to recording information and other aspects of the invention relate only to reproducing information. Thus, as the context may imply, recording/reproducing includes an apparatus for recording, an apparatus for reproducing or an apparatus for recording and reproducing information.

Upon writing, the controller 210 controls the write/read unit 220 to write data by performing logical overwriting (LOW) according to a command of a host 240 or under the control of the recording/reproducing apparatus 200. LOW denotes a technique in which data recorded in a user data area of a write-once recording medium is updated by recording replacement data in a spare area or in an unrecorded area of the user data area, and addresses of the original data and the replacement data are managed so that a host cannot recognize any change to a logical address. This management is achieved by writing a replacement entry and recording the replacement entry on the information recording medium. As described above, the controller 210 controls the write/read unit 220 to write replacement data to a spare area or to an unrecorded area of a user data area according to LOW. The controller 210 generates a block including a data part based on a write command of a host and an additional information part with a previous address field and an original address field of a block to be replaced and controls the write/read unit 220 to write the generated block to the information recording medium 400. Where a replacement entry having replacement information is not reproduced before recording or reproducing data, the controller 210 recovers the replacement entry using values of the previous address field and the original address field included in the additional information part of the block.

Figure 3:
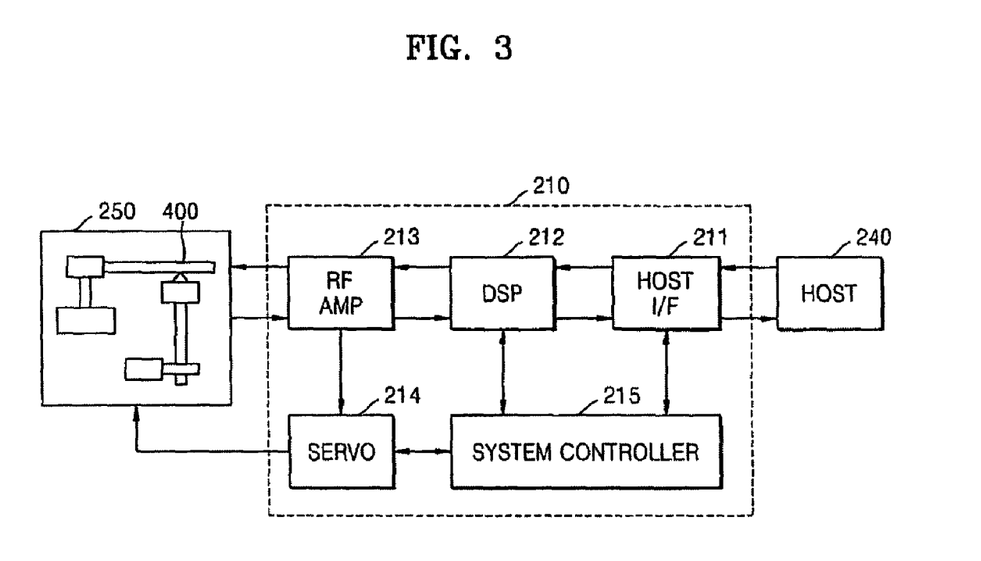
FIG. 3 is a detailed block diagram of the recording/reproducing apparatus of FIG. 2.

FIG. 3 is a detailed block diagram of the recording/reproducing apparatus 200 of FIG. 2. Referring to FIG. 3, the recording/reproducing apparatus 200, i.e., a disc drive, includes a pickup 250, which serves as the write/read unit 220. The information storage medium 400 is installed to be accessed by the pickup 250. The recording/reproducing apparatus 200 includes a host interface (I/F) 211, a digital signal processor (DSP) 212, an RF AMP 213, a servo 214, and a system controller 215, which serve as the controller 210.

Where data is to be written to the information storage medium 400, the host I/F 211 receives the data to be written and a write command together with information about a logical address of the to-be-written data from the host 240 and transmits the received data, command, and information to the system controller 215.

The system controller 215 receives the write command from the host I/F 211 and performs an initialization necessary for the writing. In particular, in a case other than where data is overwritten to a recorded area, the system controller 215 controls the pickup 250 to write the data to an address indicated by the write command. On the other hand, when data is to be overwritten to a recorded area, the system controller 215 controls the pickup 250 to write the update data to an unrecorded area of a user data area using linear replacement, generate a defect entry indicating a status of replacement based on LOW, and write the defect entry to a temporary defect information area of the information recording medium 400. Since data is written on the information recording medium 400 in a recording unit block, the system controller 215 generates a block by determining values of a previous address field and an original address field with reference to a not-yet-replaced block and replacement entry and controls the pickup 250 to write the block to the information recording medium 400.

The DSP 212 adds additional data, such as parity, to the to-be-written data received from the host I/F 211 to achieve error correction, performs ECC (error correction code) encoding on the resultant to-be-written data to produce an error-corrected block, namely, an ECC block, and modulates the ECC block in a predetermined scheme. The RF AMP 213 converts data output from the DSP 212 into an RF signal. The pickup 250 receives the RF signal from the RF AMP 213 and writes the RF signal to the information storage medium 400. The servo 214 receives a command necessary for servo control from the system controller 215 and servo-controls the pickup 250.

Where data is to be read from the information storage medium 400, the host I/F 211 receives a read command from the host 240. The system controller 215 performs an initialization necessary for the reading. In particular, the system controller 215 converts a logical address indicated by the read command into a physical address and searches for a replacement address from the replacement entry on the basis of the converted physical address. If the replacement entry cannot be read out, the system controller 215 recovers the replacement entry. The replacement entry is recovered by referring to original address information and previous address information included in a recorded block. The recovery of the replacement entry will be described in greater detail below.

The pickup 250 radiates a laser beam onto the information storage medium 400, receives a laser beam reflected by the information storage medium 400, and outputs an optical signal obtained from the received laser beam. The RF AMP 213 converts the optical signal received from the pickup 250 into the RF signal and provides modulated data extracted from the RF signal to the DSP 212 and a servo control signal extracted from the RF signal to the servo 214. The DSP 212 demodulates the modulated data, performs ECC on the demodulated data, and outputs resultant data.

The servo 214 receives the servo signal from the RF AMP 213 and the command necessary for servo control from the system controller 215 and servo-controls the pickup 250. The host I/F 211 transmits the data output from the DSP 212 to the host 240.

Figure 4:
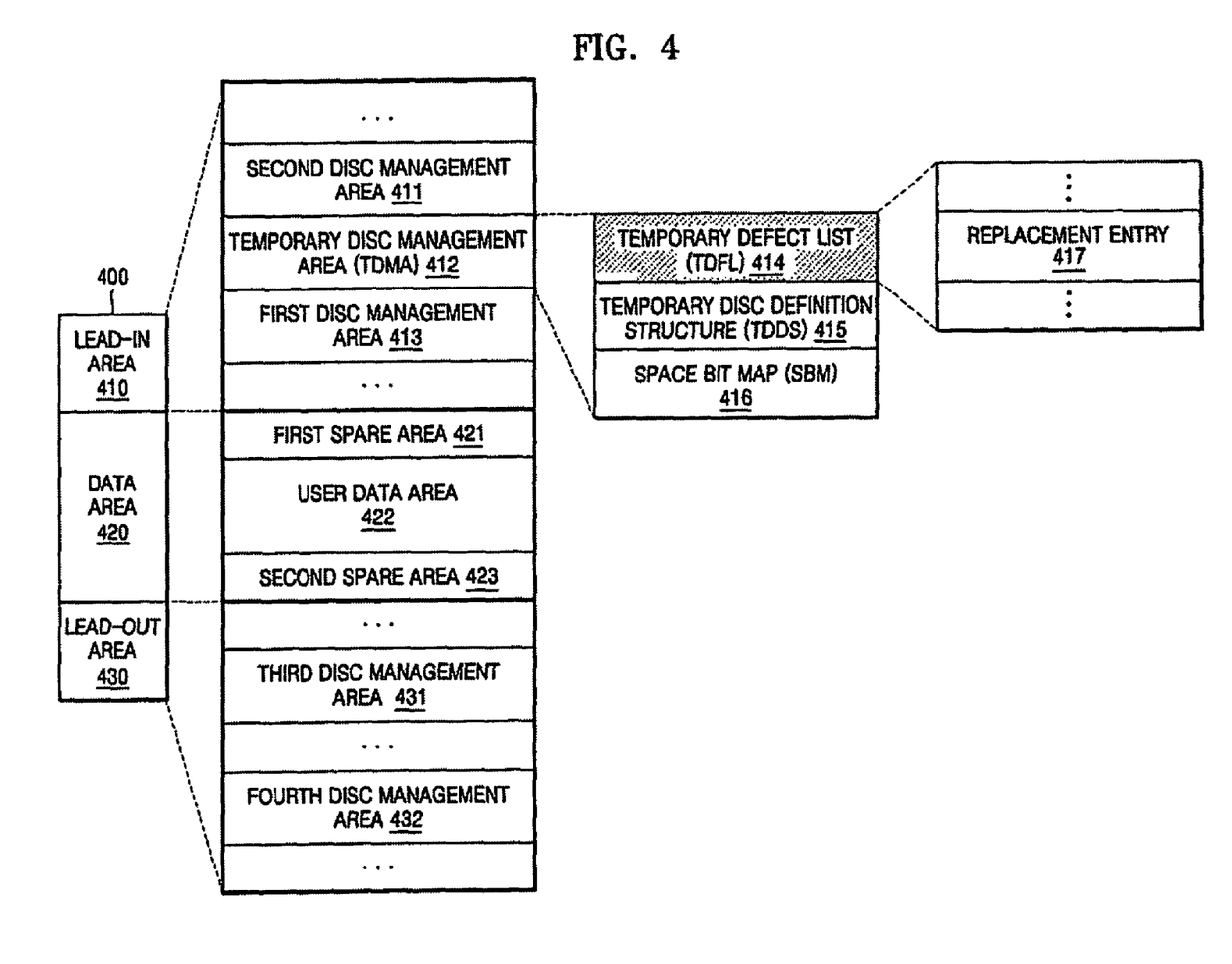
FIG. 4 is a block diagram of a structure of an information recording medium used in the recording/reproducing apparatus of FIG. 2.

FIG. 4 is a block diagram of a structure of the information recording medium 400 where the information recording medium is embodied as a disc. Referring to FIG. 4, the information recording medium 400 includes a lead-in area 410, a data area 420, and a lead-out area 430.

The lead-in area 410 includes a second disc management area 411, a temporary disc management area (TDMA) 412, a first disc management area 413, a first spare area 421, a user data area 422, a second spare area 423, a third disc management area 431, and a fourth disc management area 432.

The TDMA 412 denotes an area for recording information used for both temporary defect management and temporary information recording medium management which are required to manage a write-once information recording medium. The TDMA 412 includes a temporary defect list (TDFL) 414 as temporary defect information, a temporary disc definition structure (TDDS) 415 as temporary defect management information, and a space bit map (SBM) 416.

The TDFL 414 denotes information about a defect and includes information about a location of defective data and information about a location of replacement data of the defective data. In particular, the TDFL 414 includes a replacement entry 417.

Figure 5:
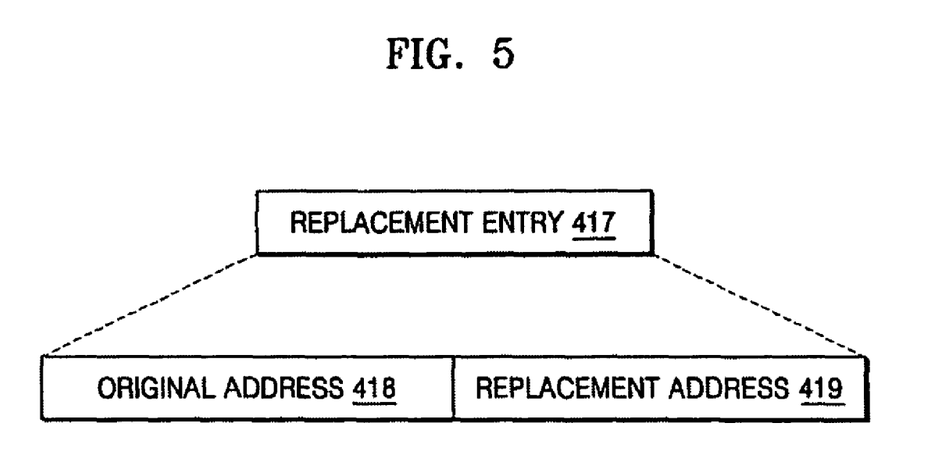
FIG. 5 is a block diagram of a data structure of a replacement entry shown in FIG. 4.

FIG. 5 illustrates a data structure of the replacement entry 417. Referring to FIG. 5, the replacement entry 417 includes an original address 418 and a replacement address 419. The original address 418 denotes a start sector address of an original block, and the replacement address 419 denotes a start sector address of a replacement block. Because replacement is performed in units of a block, which is a unit in which data is recorded/reproduced, a status of the replacement is represented as a block.

Referring again to FIG. 4, the TDDS 415 stores location pointers of the temporary defect information 414, the SBM 416, and a drive area (not shown), information about a location and size of a spare area allocated upon initialization, write-protection information, information about a location and size of a temporary defect management area (not shown) allocated in the data area 420, information about a user data area 422, information about locations on first and second spare areas 421 and 423 where replacement data can be written, information about an address of final data written in the user data area 422, etc.

The SBM 416 denotes a map in which recorded clusters and unrecorded clusters of the user data area 422 are represented as different bit values. The SBM 416 is used when the user data area 422 is used in a random recording mode. On the other hand, when the user data area 422 is used in a sequential recording mode, recording management information in which a status of an information recording medium on which data is recorded is represented as entry information is used instead of the SBM 416.

The first disc management area 413, the second disc management area 411, the third disc management area 431, and the fourth disc management area 432 are allocated to record final temporary management information when a write-once information recording medium is finalized.

The data area 420 includes the first spare area 421, the user data area 422, and the second spare area 423 that are sequentially arranged. The first and second spare areas 421 and 423 are allocated to record replacement data, that is, data that replaces data recorded in the user data area 422. The first and second space areas 421 and 423 may store replacement data that replaces defective data or replacement data necessary for LOW, namely, replacement data that replaces user data.

The user data area 422 denotes an area for recording user data. In particular, replacement data that replaces the user data according to LOW is not only recorded in the spare area 421 or 423 but also in the user data area 422. A block which is recorded as a unit is written to the user data area 422.

Figure 6:
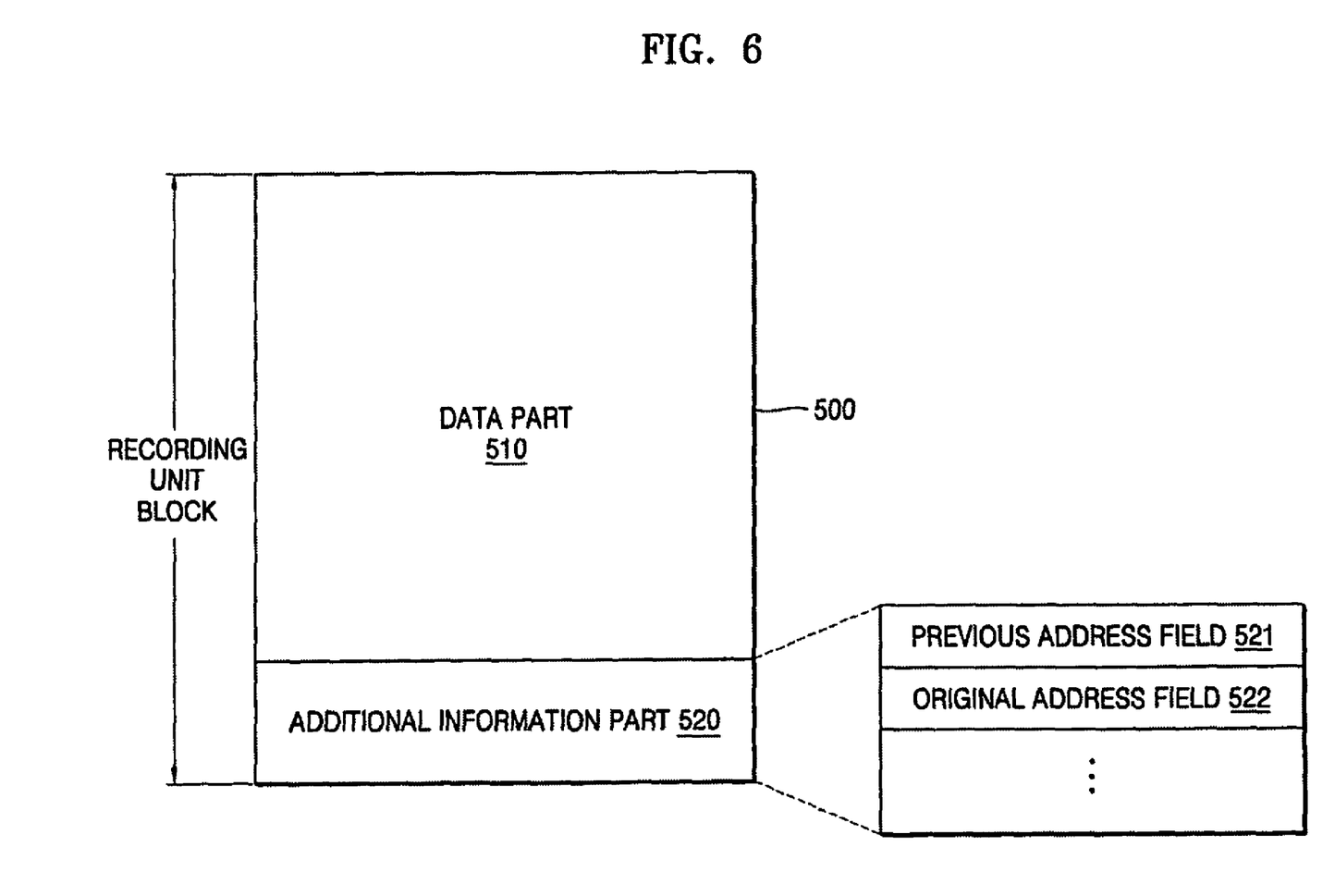
FIG. 6 is a block diagram of a structure of a block which is recorded/reproduced as a unit in/from a user data area of the information recording medium shown in FIG. 4.

A recording unit block 500 according to an embodiment of the present invention is shown in FIG. 6. Referring to FIG. 6, the recording unit block 500 includes a data part 510 and an additional information part 520. The data part 510 is user data. If the recording unit block 500 is an original block, the data part 510 is original data that is initially recorded. If the recording unit block 500 is a replacement block, the data part 510 is replacement data.

The additional information part 520 includes additional information about the original data or the replacement data. As shown in FIG. 6, the additional information part 520 includes a previous address field 521 and an original address field 522. The original address field 522 records an address representing a location of the original block. The previous address field 521 records an address representing a location of an immediately previous block, which is replaced by the recording unit block 500. The additional information part 520 may have an error correction structure different from that of the data part 510.

Figure 7A:
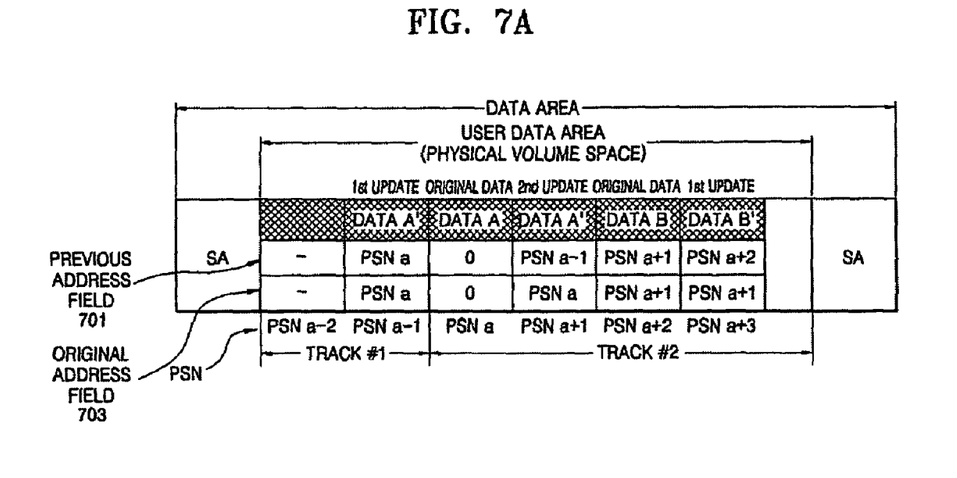
FIG. 7A illustrates a physical volume space of an information recording medium on which original and replacement blocks has been recorded, according to an embodiment of the present invention.

FIG. 7A illustrates a structure of an information recording medium on which a block which is recorded/reproduced as a unit has been recorded. More specifically, a status of the information recording medium on which address information is stored in the previous address field and the original address field of a block if the block is comprised of one sector is illustrated in FIG. 7A. In a general optical system, a host manages data in units of a sector (2048 bytes), and a drive system manages data in units of 16 or 32 sectors on an information recording medium.

Referring to FIG. 7A, when a host commands a drive system to write data A to Logical Serial Number "a" (LSN a) to record data A, the drive system writes data A to Physical Serial Number "a" (PSN a) on an information recording medium, which corresponds to the LSN a. At this time, both values of a previous address field 701 and an original address field 703 included in a block are set to be 0 to indicate that the block is an original, block, i.e., a block that is initially recorded and does not replace any block. In this way, an original block may be distinguished from a replacement block.

Other methods can be used to distinguish the replacement block from the original block. For example, the value of the previous address field or the value of the original address field may be set to be a specific identifier. Also, the value of the previous address field and the value of the original address field may be set to a same value to indicate that the block includes original data. The same value may be a value indicating the PSN where the original data is recorded.

Figure 8:
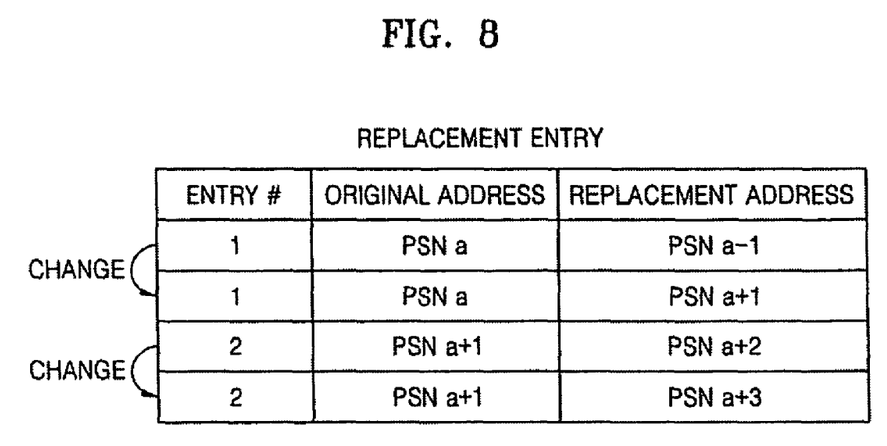
FIG. 8 is a block diagram of structures of replacement entries produced based on the recorded blocks illustrated in FIG. 7A.
Figure 9A:
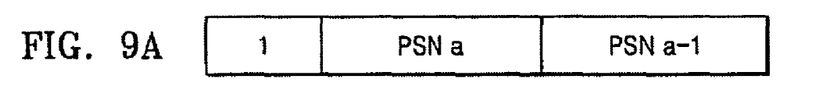
FIGS. 9A-9D are block diagram of structures of replacement entries recovered based on the recorded blocks illustrated in FIG. 7A.
Figure 9B:
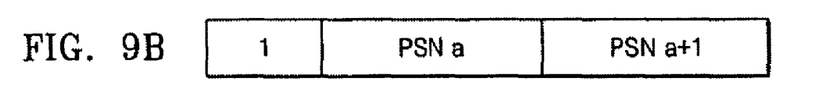
Figure 9C:
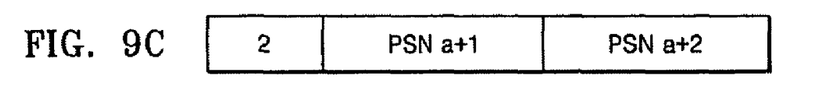
Figure 9D:
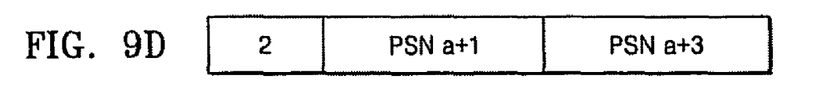

A method of recording a replacement block will now be described. To perform a 1st update of data A with data A' through LOW, the host commands the drive system to write data A' to LSN a, and the drive system writes the data A' to an unrecorded area PSN a−1 on the information recording medium by determining that the PSN a on the information recording medium corresponding to the LSN a has already been recorded with data. As shown in FIG. 8, the drive system generates a replacement entry #1 to indicate that the PSN a has been replaced by the PSN a−1. FIG. 8 shows the replacement entry #1 in which the PSN a is set as an original address and the PSN a−1 is set as a replacement address. Referring again to FIG. 7A, values of a previous address field 701 and an original address field 703 in the replacement block having the data A' and recorded in the PSN a−1 are both set to PSN a to indicate that the replacement block recorded at PSN a−1 replaces the block recorded at PSN a and that a physical address (i.e., an original address) corresponding to the logical address of data A' recorded at PSN a−1 is PSN a.

Thereafter, to perform a 2nd update of data A, i.e., update data A' with data A" according to LOW, the host commands the drive system to write data A" to LSN a, and the drive system writes the data A" to an unrecorded area PSN a+1 on the information recording medium by determining that the PSN a on the information recording medium corresponding to the LSN a has already been recorded with data and determining from the replacement entry #1 that PSN a has been replaced by PSN a−1. Also, the drive system changes replacement entry #1 to indicate that PSN a has been replaced by PSN a+1, as shown in FIG. 8. Referring again to FIG. 7A, a value of the previous address field 701 in the replacement block having the data A" and recorded at PSN a+1 is set to PSN a−1 to indicate that the replacement block replaces the block recorded at PSN a−1. A value of an original address field 703 in the replacement block having the data A" and recorded at PSN a+1 is set to PSN a to indicate that a physical address (i.e., an original address) corresponding to the logical address of data A" recorded at PSN a+1 is PSN a.

In a case where data B is to be written to the information recording medium after the 2nd update of data A with data A", the host commands the drive system to write the data B to LSN a+1, and the drive system writes the data B to an unrecorded area PSN a+2 on the information recording medium by determining that the PSN a+1 on the information recording medium corresponding to the LSN a+1 has already been recorded with data, i.e., the data A". Also, the drive system generates replacement entry #2 to indicate that PSN a+1 has been replaced by PSN a+2, thus LSN a+1 corresponds to PSN a+2, as shown in FIG. 8. Referring again to FIG. 7A, values of the previous address field 701 and the original address field 703 in the block including the data B and recorded at PSN a+2 are both set to PSN a+1 to indicate that the block recorded at PSN a+2 includes original data, i.e., data B (although subsequently recorded) and that a physical address corresponding to the logical address of the data B recorded at PSN a+2 is PSN a+1.

Thereafter, to update data B with data B' according to LOW, the host commands the drive system to write data B' to LSN a+1, and the drive system writes the data B' to an unrecorded area PSN a+3 on the information recording medium by determining that the PSN a+1 on the information recording medium corresponding to the LSN a+1 has already been recorded with data (i.e., data A") and determining from the replacement entry #2 that original address PSN a+1 has been replaced by PSN a+2. Also, the drive system changes replacement entry #2 to indicate that PSN a+1 has been replaced by PSN a+3. FIG. 8 also shows the changed replacement entry #2 in which the replacement address is PSN a+3. Referring again to FIG. 7A, a value of the previous address field 701 in the replacement block including data B' and recorded at PSN a+3 is set to PSN a+2 to indicate that the replacement block replaces the block recorded at PSN a+2. A value of an original address field in the replacement block including the data B' and recorded at PSN a+2 is set to PSN a+1 to indicate that a physical address (i.e., an original address) corresponding to the logical address of data B' recorded at PSN a+3 is PSN a+1.

Figure 7B:
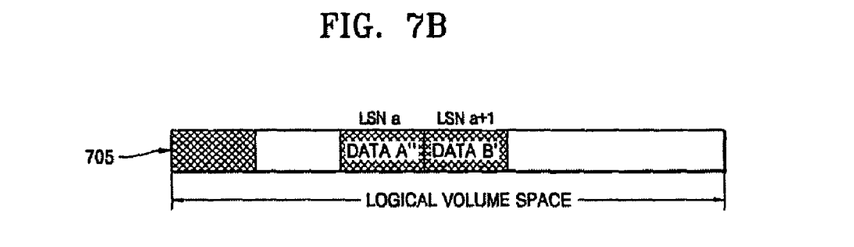
FIG. 7B illustrates a logical volume space of the information recording medium shown in FIG. 7

A resulting logical volume space 703 generated by replacing the data A with the data A' and then with the data A" and subsequently recording the data B and then replacing the data B with the data B' is shown in FIG. 7B. That is, data A" corresponds to LSN a and the data B' corresponds to LSN a+1.

A method of recovering a replacement entry will now be described. If an information recording medium on which data is written as described above is loaded on a drive system, and the drive system fails to obtain a final TDFL from a temporary defect management area of a lead-in or lead-out area of the information recording medium, the drive system must recover at least a replacement entry, which indicates a status of the information recording medium on which replacement data required upon defect generation or LOW has been recorded, among the TDFL. The replacement entry is recovered using values of a previous address field and an original address field included in an additional information part of a block recorded on the information recording medium. This replacement entry recovery will now be described with reference to FIGS. 7A through 9D.

First, assuming, for example, values as shown in FIG. 7A, the drive system reads out a block recorded at PSN a−1 and determines from a value PSN a set in the previous address field 701 of the read-out block that PSN a−1 previously replaced PSN a and from a value PSN a set in the original address field 703 of the read-out block that data A' recorded at PSN a−1 has a logical address corresponding to PSN a. According to this determination, the drive system recovers replacement entry #1 of FIG. 9A, which indicates a status of the information recording medium on which a block recorded at PSN a has been replaced by a block recorded at PSN a−1.

Then, the drive system reads out a block recorded at PSN a and determines from a value "0" set in both the previous address field 701 and the original address field 703 of the read-out block PSN a that the read-out block PSN a is an original block, namely, a non-replaced block.

Thereafter, the drive system reads out a block recorded at PSN a+1 and determines from a value PSN a−1 set in the previous address field 701 of the read-out block PSN a+1 that the read-out block PSN a+1 has replaced the block recorded at PSN a−1 and from a value PSN a set in an original address field 703 of the read-out block PSN a+1 that user data included in the read-out block PSN a+1 has a logical address corresponding to PSN a. Since the drive system can determine from the replacement entry #1 of FIG. 9A that the block with address PSN a has been replaced by the block with address PSN a−1 and the block with address PSN a−1 has been replaced by the block with address PSN a+1, the drive system changes the replacement address of the replacement entry #1 of FIG. 9A from PSN a−1 to PSN a+1 to recover replacement entry #1 of FIG. 9B.

Then, the drive system reads out a block recorded at PSN a+2 and determines from a value PSN a+1 set in the previous address field 701 of the read-out block that the read-out block PSN a+2 has replaced the block with address PSN a+1 and from a value PSN a+1 set in the original address field 703 of the read-out block PSN a+2 that user data included in the read-out block PSN a+2 has a logical address corresponding to PSN a+1. According to this determination, the drive system recovers replacement entry #2 of FIG. 9C, which indicates a status of the information recording medium on which PSN a+1 has been replaced by PSN a+2.

Thereafter, the drive system reads out a block recorded at PSN a+3 and determines from a value PSN a+2 set in the previous address field 701 of the read-out block that the read-out block PSN a+3 has replaced the block recorded at PSN a+2 and from a value PSN a+1 set in an original address field 703 of the read-out block that user data included in the read-out block PSN a+3 has a logical address corresponding to PSN a+1. Since the drive system can determine from the replacement entry #2 of FIG. 9C that the block with address PSN a+1 has been replaced by the block with address PSN a+2 and can determine from the value PSN a+2 read out from the block PSN a+3 the block with address PSN a+2 has been replaced by the block with address PSN a+3, the drive system changes the replacement address of the replacement entry #2 of FIG. 9C from PSN a+2 to PSN a+3 to recover replacement entry #2 of FIG. 9D.

As described above, exact replacement entry #1 and exact replacement entry #2 are recoverable using a previous address field and an original address field included in an additional information part of a block. More specifically, in a replacement entry recovering method according to an embodiment of the present invention, the location of a final replacement block is recognizable from values set in the previous address fields of reproduced blocks having original address fields in which an identical value is stored, so that correct replacement entries for the blocks are recoverable. In other words, an original address field of a reproduced block provides a physical address of an original block to be set as an original address of a replacement entry for the reproduced block, and a previous address field of the reproduced block provides a physical address of a final replacement block of the original block to be set as a replacement address of the replacement entry.

In the example shown in FIG. 7A, it can be seen that if a recorded block only includes the original address field 703, a replacement entry for the recorded block cannot be properly recovered. However, the replacement entry may be properly recovered using only the original address field 703 of a reproduced block by applying restrictions to a method of recording a replacement block. Where replacement blocks are recorded in a predetermined sequence, the replacement entry may be recovered using only values recorded in the original address field 703 by reference to the original address field 703 values and the predetermined sequence. That is, where the PSN of a later block in the sequence has a value recorded in the original address field 703 which corresponds to the PSN of an earlier block in the sequence, it may be determined that the later block in the sequence replaces the earlier block in the sequence. Thus, the PSN of a latest block in the sequence having a value corresponding to the PSN of the earlier block in the sequence recorded in the original address field 703 is a final replacement block for the earlier block in the sequence.

For example, if replacement is performed under a rule that a physical address of a current replacement block is always greater than a physical address of each previous replacement block and a physical address of an original block, it can be determined from a history of replacement contained in an arrangement of physical addresses that a replacement block having a highest physical address in a sequence of replacement blocks is the final replacement block.

As another example, if replacement is performed under a rule that a physical address of a current replacement block is always smaller than a physical address of each previous replacement block and a physical address of an original block, it can be determined from a history of replacement contained in an arrangement of physical addresses that a replacement block having a lowest physical address in a sequence of replacement blocks is the final replacement block.

If only the previous address field 701 is included in a block in the case of FIG. 7A, a wrong replacement entry is recovered by recognizing that a block recorded at PSN a has been replaced by a block recorded at PSN a+3. However, if data B were allowed to be recorded at LSN a+2 instead of LSN a+1 (that is, if writing of data to an area that is recorded with data in a physical space although being unrecorded in a logical space is prohibited or if a drive system informs a host of an error on receipt of a command to write data to such an area described above), data B could be recorded at PSN a+2 corresponding to LSN a+2, and data B' could be recorded at PSN a+3 according to LOW. As described above, if writing of data to an area that is recorded with data in a physical space although being unrecorded in a logical space is prohibited or if a drive system informs a host of an error on receipt of a command to write data to such an area described above, problems as shown in FIGS. 1B and 1C can be solved. Only in this case, even where only a previous address field is used as address information to recover a replacement entry, the replacement entry may be correctly recovered.

Figure 10:
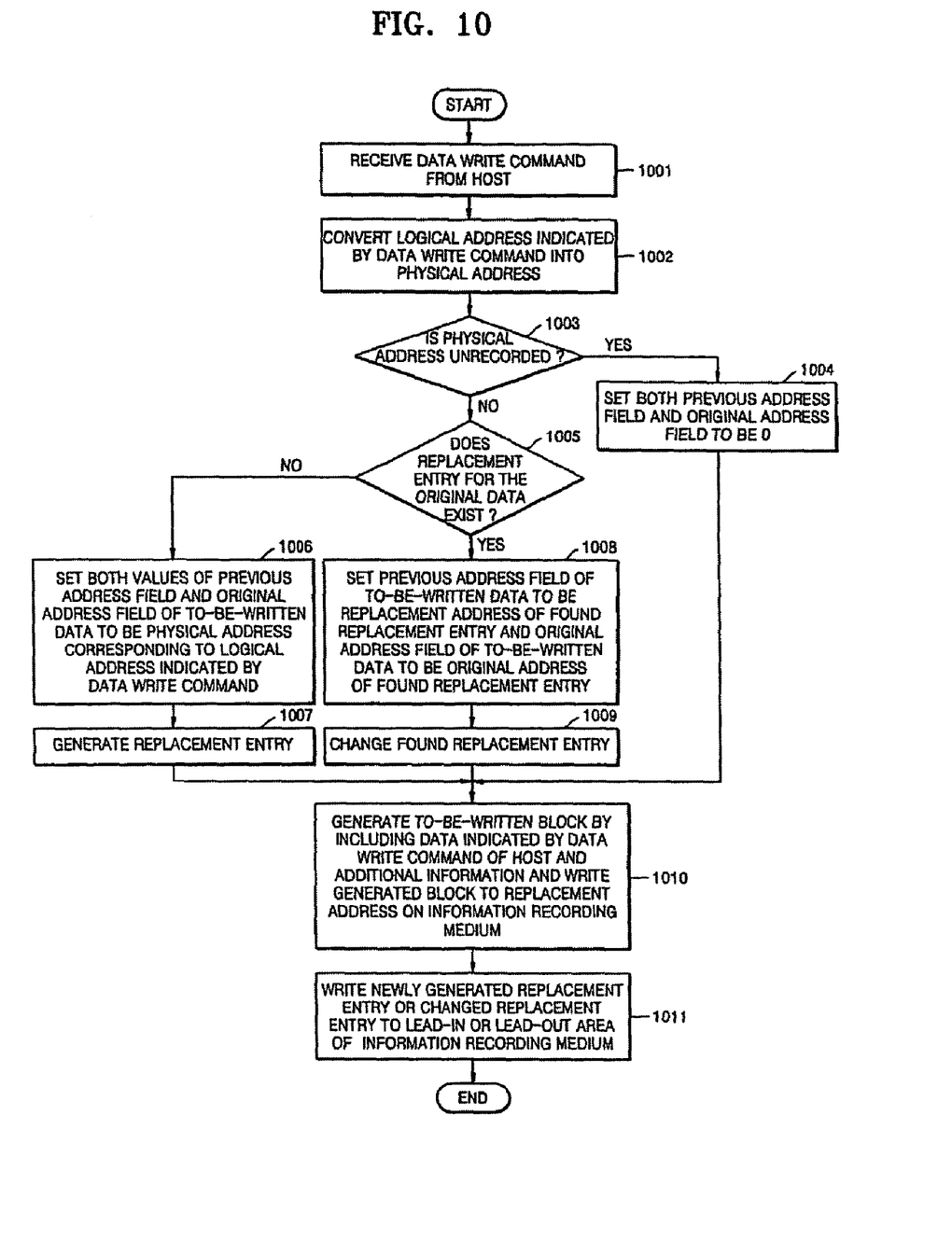
FIG. 10 is a flowchart illustrating a method of recording data according to an embodiment of the present invention.

FIG. 10 is a flowchart illustrating a method of recording data according to an embodiment of the present invention. In operation 1001, a drive system receives a data write command from a host. Since the host only operates with logical addresses, the host provides to the drive system a logical address where data is to be recorded.

In operation 1002, the drive system converts a logical address indicated by the data write command into a physical address. In operation 1003, the drive system determines whether the physical address is unrecorded. Where the physical address is unrecorded, the drive system determines that data indicated by the data write command is not replacement data but new user data, and thus a previous address field and an original address field are both set to be 0, in operation 1004.

When it is determined that the physical address is recorded, the drive system determines that data indicated by the data write command denotes replacement data with which data already recorded in the recorded physical address is to be updated, and thus a replacement entry for the original data is searched for, in operation 1005.

Where no replacement entries are found, values of a previous address field and an original address field of the replacement data, that is, a replacement block to be currently recorded, are both set to be the physical address corresponding to the logical address indicated by the data write command, in operation 1006. The physical address indicates a location where the original user data has been recorded. In operation 1007, a replacement entry including an original address and a replacement address is generated. The original address identifies the physical address of the original user data, and the replacement address identifies a physical address in which the current replacement block is to be recorded.

Where the replacement entry is found, it may be determined whether the original data has been preciously replaced, and accordingly, the values of the previous address field and the original address field of the current replacement block are determined with reference to the found replacement entry. In other words, in operation 1008, the previous address field of the current replacement block is set to be a replacement address of the found replacement entry, and the original address field of the current replacement block is set to be the original address of the found replacement entry. In operation 1009, the replacement address of the found replacement entry is changed from the physical address of the previous replacement block to the physical address of the current replacement block.

In operation 1010, the current replacement block is generated by including the data indicated by the data write command of the host and additional information (the previous address field and the original address field) and recorded at the replacement address on an information recording medium. In operation 1011, the newly produced replacement entry or the changed replacement entry is recorded in a lead-in or lead-out area of the information recording medium.

Figure 11:
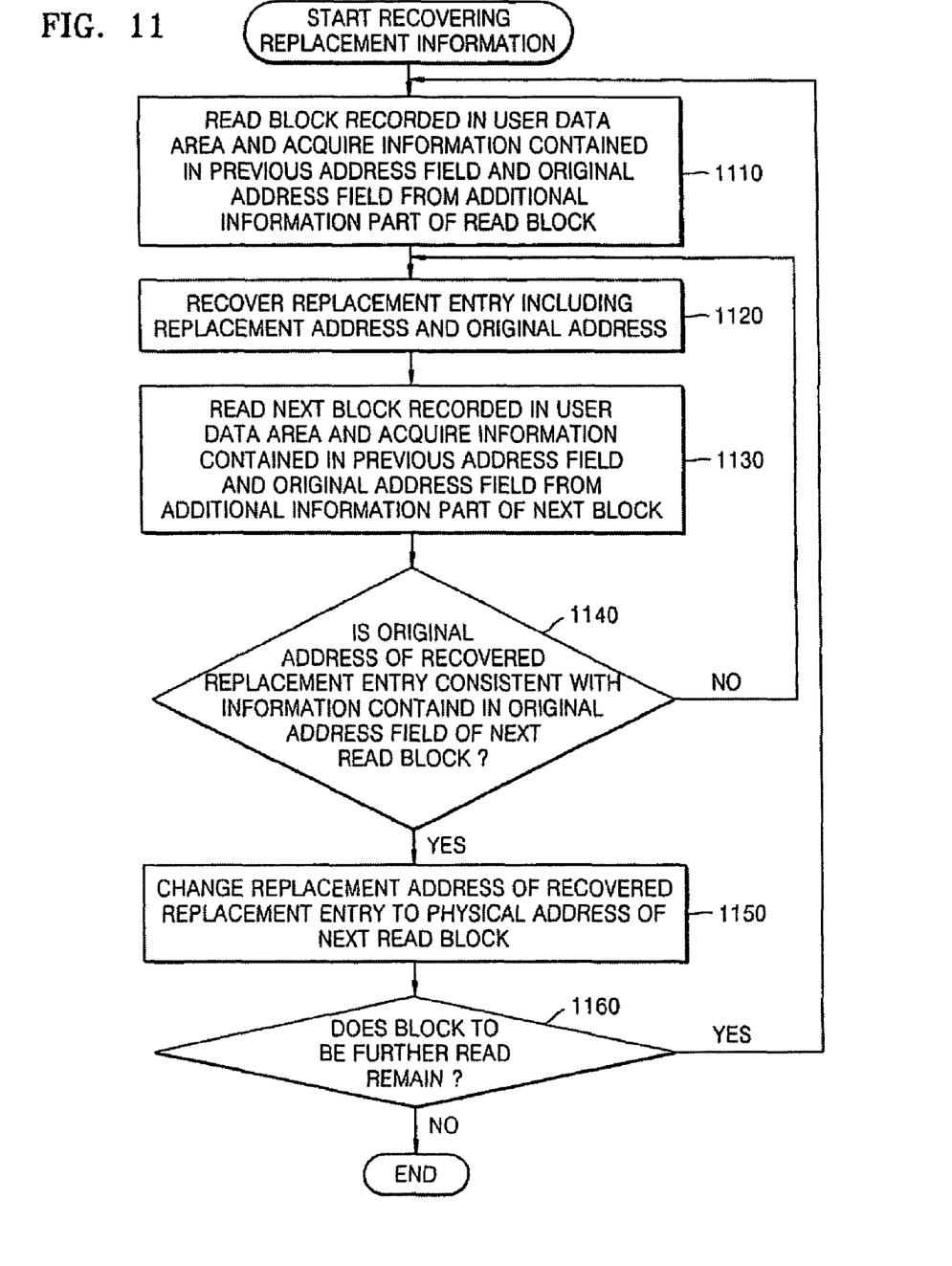
FIG. 11 is a flowchart illustrating a method of recovering a replacement entry according to the present invention.

FIG. 11 is a flowchart illustrating a method of recovering a replacement entry according to an aspect of the present invention. First, in operation 1110, a block recorded in a user data area is reproduced, and information contained in a previous address field and an original address field is acquired from an additional information part of the reproduced block.

In operation 1120, a replacement entry including a replacement address and an original address is recovered. A physical address of a first reproduced block is set as the replacement address of the replacement entry, and the value of the original address field included in the additional information part of the first reproduced block is set as the original address of the replacement entry.

In operation 1130, a second block next to the first reproduced block and recorded in the user data area is reproduced, and information contained in a previous address field and an original address field is acquired from the additional information part of the second block. In operation 1140, it is determined whether the original address of the recovered replacement entry is consistent with the information contained in the original address field of the second reproduced block.

If the original address of the recovered replacement entry is different from the information contained in the original address field of the second reproduced block, the second reproduced block is new user data different from user data of the first reproduced block. Hence, the method goes back to operation 1120 to recover a replacement entry for the second block reproduced in operation 1130.

If the original address of the recovered replacement entry is identical to the information contained in the original address field of the second reproduced block, the second block reproduced in operation 1130 is not new user data but replacement data that replaces the same user data as the user data replaced by the first reproduced block. Hence, in operation 1150, the replacement address of the recovered replacement entry is changed to a physical address of the next reproduced block.

Then, in operation 1160, it is determined whether a block to be further reproduced exists. If a block to be further reproduced exists, the method goes back to operation 1110 to reproduce the remaining block. If no blocks to be further reproduced exist, the method is concluded.

According to an aspect of the present invention as described above, replacement information can be effectively recovered in a system where a replacement for LOW occurs in a spare area or in a user data area. Thus, the efficiency of data reproduction improves.

A data recording/reproducing method and a replacement entry recovering method as described above may also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Also, functional programs, codes, and code segments for accomplishing the data recording/reproducing method and the replacement entry recovering method may be construed by programmers skilled in the art of information recording.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An information storage medium, comprising:
    a second recording unit block which replaces a first recording unit block, and comprises physical address information of the first recording unit block or physical address information of a third recording unit block which is replaced by the second recording unit block; and
    a defect list entry which comprises physical address information of the first recording unit block and physical address information of the second recording unit block,
    wherein replacement data recorded in the second recording unit block is reproduced using the defect list entry, and logical addresses of the first recording unit block, the second recording unit block, and the third recording unit block are the same.

2. The information storage medium of claim 1, wherein the second recording unit block comprises:
    the physical address information of the first recording unit block; and
    the physical address information of the third recording unit block which is replaced by the second recording unit block.

3. A recording apparatus for recording data on an information recording medium, the recording apparatus comprising:
    a write/read unit writing data to and/or reading data from the information recording medium; and
    a controller controlling the write/read unit to write a second recording unit block which replaces a first recording unit block, and comprises physical address information of the first recording unit block or physical address information of a third recording unit block which is replaced by the second recording unit block, and a defect list entry which comprises physical address information of the first recording unit block and physical address information of the second recording unit block, on the information recording medium,
    wherein replacement data recorded in the second recording unit block is reproduced using the defect list entry, and logical addresses of the first recording unit block, the second recording unit block, and the third recording unit block are the same.

4. The recording apparatus of claim 3, wherein the second recording unit block comprises:
    the physical address information of the first recording unit block; and
    the physical address information of the third recording unit block which is replaced by the second recording unit block.

5. A reproducing apparatus for reproducing data from an information recording medium comprising a second recording unit block which replaces a first recording unit block, and comprises physical address information of the first recording unit block or physical address information of a third recording unit block which is replaced by the second recording unit block, the reproducing apparatus comprising:
    a write/read unit writing data to and reading data from an information recording medium; and
    a controller which controls the write/read unit to read a defect list entry which comprises physical address information of the first recording unit block and physical address information of the second recording unit block, from the information recording medium, and to read replacement data stored in the second recording unit block using the defect list entry,
    wherein logical addresses of the first recording unit block, the second recording unit block, and the third recording unit block are the same.

6. The reproducing apparatus of claim 5, wherein the second recording unit block comprises:
    the physical address information of the first recording unit block; and
    the physical address information of the third recording unit block which is replaced by the second recording unit block.

7. A recording method for recording data on an information recording medium, the recording method comprising:
    recording a second recording unit block which replaces a first recording unit block, and comprises physical address information of the first recording unit block or physical address information of a third recording unit block which is replaced by the second recording unit block, and a defect list entry which comprises physical address information of the first recording unit block and physical address information of the second recording unit block, on the information recording medium,
    wherein replacement data recorded in the second recording unit block is reproduced using the defect list entry, and logical addresses of the first recording unit block, the second recording unit block, and the third recording unit block are the same.

8. The recording method of claim 7, wherein the second recording unit block comprises:
    the physical address information of the first recording unit block; and
    the physical address information of the third recording unit block which is replaced by the second recording unit block.

9. A reproducing method for reproducing data from an information recording medium comprising a second recording unit block which replaces a first recording unit block, and comprises physical address information of the first recording unit block or physical address information of a third recording unit block which is replaced by the second recording unit block, the reproducing method comprising:
    reading a defect list entry which comprises physical address information of the first recording unit block and physical address information of the second recording unit block, from the information recording medium; and
    reproducing replacement data stored in the second recording unit block using the defect list entry,
    wherein logical addresses of the first recording unit block, the second recording unit block, and the third recording unit block are the same.

10. The reproducing method of claim 9, wherein the second recording unit block comprises:
    the physical address information of the first recording unit block; and
    the physical address information of the third recording unit block which is replaced by the second recording unit block.

* * * * *